United States Patent [19]

Jones

[11] 3,716,337
[45] Feb. 13, 1973

[54] GAS MONITORING APPARATUS
[75] Inventor: William J. Jones, Pittsburgh, Pa.
[73] Assignee: Westinghouse Electric Corporation, Pittsburgh, Pa.
[22] Filed: March 6, 1970
[21] Appl. No.: 17,194

[52] U.S. Cl..............23/254 E, 23/232 E, 23/232 R, 23/254 R, 73/26
[51] Int. Cl....G01n 25/48, G01n 27/02, G01n 31/06
[58] Field of Search ....23/230, 232, 253, 254; 73/26, 73/27

[56] References Cited

UNITED STATES PATENTS 3,472,629  10/1969  Rommel et al. ......................23/254
3,436,190  4/1969  Priestley et al. ......................23/253

Primary Examiner—Morris O. Wolk
Assistant Examiner—Elliott A. Katz
Attorney—F. H. Henson, E. P. Klipfel and D. Schron

[57] ABSTRACT

A gas containing carbon dioxide is passed over a bed of carbon dioxide absorbent which contains an elongated temperature sensor which measures the peak temperature along its length and provides a temperature signal. A second sensor which measures the temperature of the gas prior to its reaction with the absorbent provides a second temperature signal. The signals are combined to get a resultant which is indicative of the carbon dioxide present in the gas.

4 Claims, 6 Drawing Figures

PATENTED FEB 13 1973 3,716,337

WITNESSES:
Bernard R. Gregory
James F. Young

INVENTOR
William J. Jones
BY Dean Schron
ATTORNEY

GAS MONITORING APPARATUS

BACKGROUND OF THE INVENTION

1. Field of the Invention

Gas absorption and monitoring systems utilizing chemical reactions.

2. Description of the Prior Art

One environment where it is desired to remove and monitor a particular gas of a gas mixture is the life support field wherein personnel are provided with a respirable atmosphere which is recirculated after the removal of carbon dioxide. For such removal, a bed of carbon dioxide absorbent is generally placed within a container and the atmosphere is passed through the reactant bed. By a chemical reaction the carbon dioxide is absorbed and a certain quantity of heat and water vapor are released, the quantity being dependent upon the quantity of carbon dioxide absorbed. To obtain an indication of the quantity of carbon dioxide, the temperature of the gas in the reaction zone may be compared with the temperature of the gas mixture prior to the reaction and the difference in temperature is indicative of the carbon dioxide present.

A problem arises however in measuring the temperature of the gas in the reaction zone since a temperature sensor such as a thermocouple placed at one position within the bed of reactant material will not give a true reading of reaction zone temperature since, as the absorbent material is used up, the reactant zone progressively moves from one end of the bed to the other. A plurality of thermocouples disposed along the length of the bed may be utilized however electronic scanning, logic and detection circuitry would be required.

SUMMARY OF THE INVENTION

Apparatus is provided for removing and monitoring a particular gas of a gas mixture. A container which receives the gas mixture has a bed of reactant material of the type which absorbs the particular gas to be monitored, in a reaction which liberates a certain proportional quantity of heat. A first temperature sensor is disposed along the length of the bed of reactant material and is operable to provide a first output signal indicative of the peak temperature along its length. A second temperature sensor which provides a second output signal is positioned to obtain an indication of the temperature of the gas mixture prior to the reaction. The two signals are combined to obtain an indication of the difference between them, with the indication being related to the quantity of gas present.

The first temperature sensor means additionally includes means for providing an indication of where along its length the peak temperature occurs, thereby providing an indication of the amount of reactant material remaining.

DESCRIPTION OF THE PREFERRED EMBODIMENT

Figure 1:
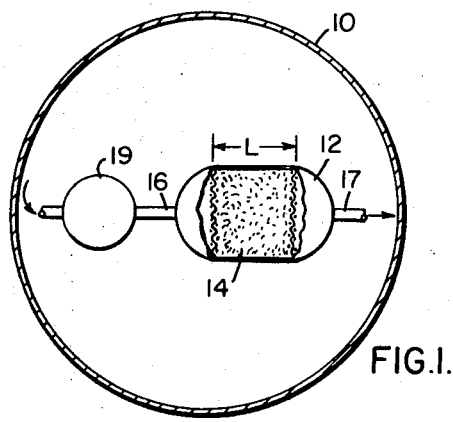
FIG. 1 illustrates a typical embodiment in which the present invention may be utilized.

In FIG. 1 there is illustrated a closed environment such as a chamber 10 at a pressure of one atmosphere, for containing one or more persons and a breathable gas mixture. Such chamber 10, for example, may be the pressure sphere of a deep diving underwater submersible vehicle. As the oxygen is used up by the personnel, it is replenished, and exhaled carbon dioxide is absorbed. This absorption of the carbon dioxide is accomplished by the provision of a carbon dioxide absorber unit 12 containing a bed 14 of carbon dioxide absorbent material extending for a length L between an input 16 and an output 17 of the absorber 12.

The gas mixture in the chamber 10 is forced over the bed of reactant material 14 by means of, for example, a blower 19. The gas mixture entering the blower has a certain quantity of carbon dioxide therein and the gas mixture exiting from the output 17 is free of carbon dioxide and contains a small amount of water vapor due to the reaction within the absorber 12. The reaction is one which liberates heat, and to provide an indication of the amount of carbon dioxide present it would be desired to know the temperature of the reaction so that it may be compared with the temperature of the gas mixture entering the absorber 12. The problem in obtaining an indication of the temperature of the reaction is graphically illustrated in FIGS. 2A to 2C, wherein the horizontal scale represents the distance along the reactant bed, such as the distance L in FIG. 1, and the vertical scale represents temperature.

Figure 2A:
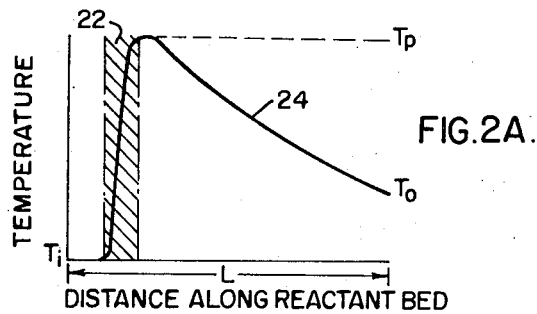
FIGS. 2A, B and C are curves illustrating the problem in obtaining temperature readings for a typical apparatus as in FIG. 1.

The reactant material, which may be a metal hydroxide such as lithium hydroxide, reacts with the carbon dioxide present in the gas mixture in an exothermic reaction which forms lithium carbonate and water vapor. The reaction takes place within a relatively narrow reaction zone 22. The temperature of the gas mixture prior to the reaction is designated $T_i$ and the temperature curve 24 is seen to increase to a maximum within the reaction zone 22. This maximum or peak temperature is designated $T_p$. Subsequent to the reaction zone, heat is lost to the unused reactant bed and the environment and the temperature of the gas leaving the reactant bed is not at all representative of the peak temperature. In FIG. 2A, due to heat losses, the temperature of the exiting gas is of a magnitude $T_o$.

Figure 2B:
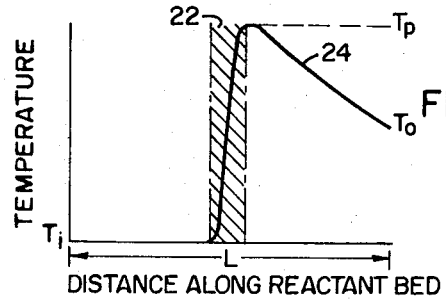
Figure 2C:
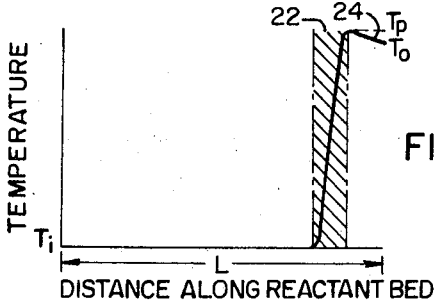

As the reaction zone 22 moves along the bed, as illustrated in FIG. 2B, the output temperature $T_o$ increases in magnitude and when the reaction zone 22 is close to the end of the bed, as in FIG. 2C, the output temperature $T_o$ is very close to the peak temperature $T_p$. However at no time during the reaction, until the bed of reactive material is used up, does the output temperature equal the peak temperature of reaction. Accordingly, to obtain an indication of the peak temperature one would have to know the rate of travel of the reaction zone and move a thermocouple through the bed at that same rate, or provide a plurality of thermocouples disposed along the length of the bed with proper scanning and logic circuitry. In the present invention an indication of the amount of carbon dioxide present is obtained without the requirement for moving or scanning systems.

Figure 3:
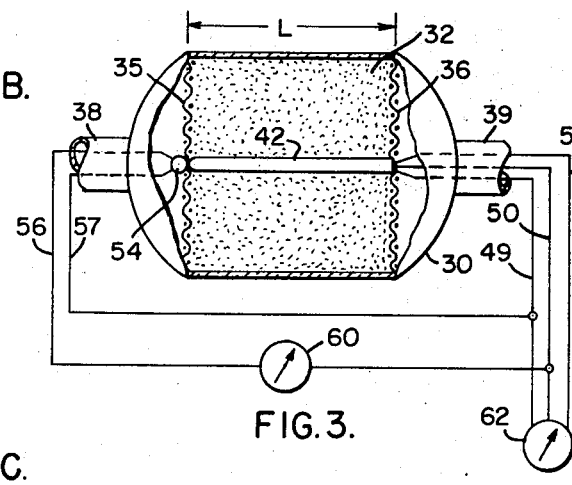
FIG. 3 illustrates, partially in section, a preferred embodiment of the present invention.

FIG. 3 illustrating an embodiment of the present invention includes a container in the form of canister 30 having a carbon dioxide absorbent 32 contained therein between screens 35 and 36 separated by a distance L. The container 30 has an input 38 for receiving a carbon dioxide laden gas mixture, and an output 39.

Disposed within the bed of absorbent material 32 is a first temperature of reactant 42 which is preferably axially arranged within the bed 32 and which extends the length of the bed. The temperature sensor 42 is of the type which is a self-generating thermoelectric transducer which provides an output voltage corresponding to the highest temperature to which the transducer is exposed. One such type of temperature sensor is furnished under the name of Magic Wire by Continental Sensing, Inc. of Melrose Park, Illinois.

Figure 4:
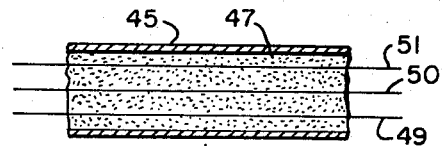
FIG. 4 illustrates a portion of the temperature sensor of FIG. 3 in somewhat more detail.

The sensor, as illustrated in FIG. 4, includes an outer metallic sheath 45 which contains an insulation material 47 having a negative resistance temperature coefficient. Disposed within the sheath are two thermoelement conductors 49 and 50. If a temperature is provided at the position indicated by the arrow, an output voltage or signal will be produced which is indicative of the temperature. A higher temperature occurring at any other position along the length of the sensor will produce a proportionally higher output signal. A third wire 51 is provided, and with the inclusion of a bridge network (not illustrated) the location of the peak temperature along the length of the sensor may be obtained.

Referring back to FIG. 3, a second temperature sensor means in the form of temperature sensor 54 is positioned to sense the temperature of the gas mixture prior to reaction and to provide a corresponding output signal. The temperature sensor 54 may be a thermocouple which provides an electrical output signal on output wires 56 and 57. Once the input and peak temperatures are known, the quantity of carbon dioxide present may be obtained from a knowledge of the gas composition and temperature rise according to the relationship:

$$X = (MC_p/Q) \Delta T$$

where
$\Delta T$ = gas temperature rise ($T_p$-$T_i$)
$Q$ = heat of reaction BTU/mole $CO_2$
$C_p$ = specific heat of gas mixture BTU/lb°F
$M$ = molecular weight of gas mixture lb/mole
$X$ = volume fraction of $CO_2$ in gas mixture Accordingly, means are provided for obtaining an indication of the difference between the signal provided by the first temperature sensor 42 and the signal provided by the second temperature sensor 54. This is accomplished by the connection of wires 49 and 57 from temperature sensors 42 and 54 and the provision of an indicating instrument 60 electrically connected to wires 50 and 56 of temperature sensors 42 and 54 respectively. With a knowledge of the gas composition, the indicating instrument 60 may be calibrated directly in volume (or mole) fraction of carbon dioxide present in the gas mixture.

Another indicating instrument 62 is connected to receive the three wires from the first temperature sensor 42 and includes a bridge network for determining the location of the peak temperature along the length of the temperature sensor 42. In this manner, with a knowledge that the peak temperature occurs within the reaction zone, an indication may be had of the amount of reactant material left in the canister for absorbing carbon dioxide.

I claim:

1. Apparatus for removing and monitoring a particular gas of a gas mixture containing said gas, comprising:
   a. a container having an input for receiving said gas mixture, and an output;
   b. said container having therein a bed of reactant material of the type which will absorb said gas in a reaction which liberates a certain quantity of heat dependent upon the quantity of said gas absorbed;
   c. first temperature sensor means disposed along the length of said bed of reactant material and operable to provide a first output signal indicative of the peak temperature along the said length; and
   d. second temperature sensor means for providing a second output signal indicative of the temperature of said gas mixture prior to said reaction; and
   e. means for providing an indication of the difference between said first and second output signals.

2. Apparatus according to claim 1 wherein:
   a. said first temperature sensor means is surrounded by said reactant material and is substantially centrally aligned therein.

3. Apparatus according to claim 1 which additionally includes:
   a. means for providing an indication of the location of peak temperature along the length of said first temperature sensor means.

4. Apparatus according to claim 1 which additionally includes:
   a. a contained environment wherein said gas mixture is a breathable gas mixture and said particular gas is carbon dioxide;
   b. means connected to said input for forcing said gas mixture through said bed of reactant material; and
   c. said output being dischargeable to said environment.

* * * * *